UNITED STATES PATENT OFFICE.

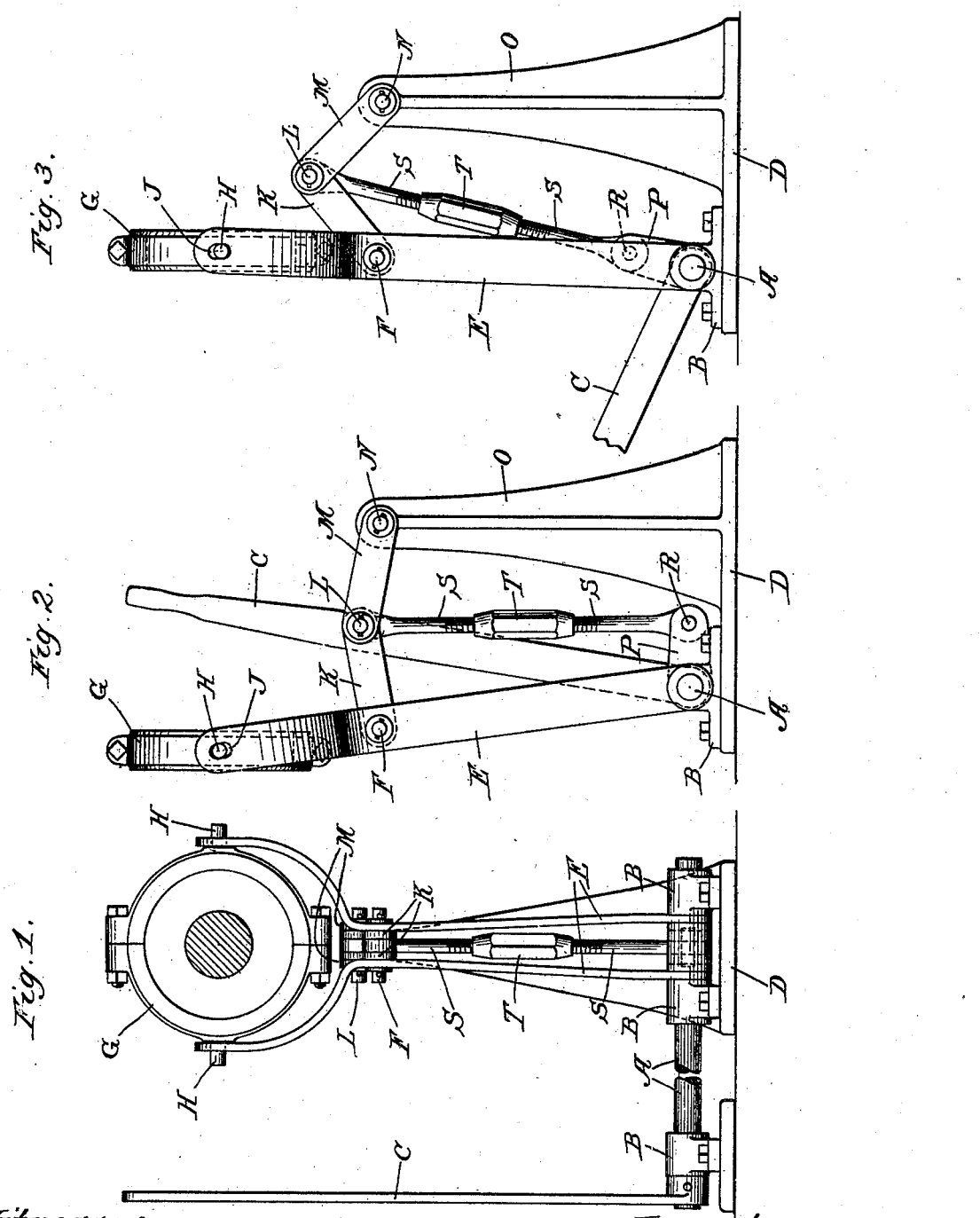

GEORGE LEWIS HOLMES, OF CHICAGO, ILLINOIS, ASSIGNOR TO THE LINK BELT MACHINERY COMPANY, OF CHICAGO, ILLINOIS, A CORPORATION OF ILLINOIS.

CLUTCH-OPERATING DEVICE.

SPECIFICATION forming part of Letters Patent No. 696,973, dated April 8, 1902.

Application filed June 7, 1901. Serial No. 63,566. (No model.)

*To all whom it may concern:*

Be it known that I, GEORGE LEWIS HOLMES, a citizen of the United States, residing at Chicago, in the county of Cook and State of Illinois, have invented a certain new and useful Improvement in Clutch-Operating Devices, of which the following is a specification.

My invention relates to means and devices for operating clutch mechanisms or for operating like mechanisms wherein a part is to be moved to the limits of its excursion in two opposite directions and is in each case expected to remain securely in such new position. In the case of a clutch-block the clutch is set by the motion of some part which moves to the limit of its excursion in one direction. It is of course desirable that such part should stay there and not be permitted to return, for otherwise the clutch would be loosened. On the other hand, when the clutch is free the same part is moved to the limit of its excursion in the opposite direction and it should remain there, for otherwise the clutch is liable to be again thrown partly into action. Again, it may happen with clutch mechanisms that they are thrown into operative positions at either end of the excursion of such operative parts.

I do not intend to show any particular clutch mechanism, as it will be readily understood that the device will be applicable to clutches or other mechanisms having need for the kind of control provided by my device.

Broadly speaking, the object of my invention is to provide means whereby the device can be easily moved by the operator from either limit of its excursion to the other, but whereby it is securely locked at such limit until the operator is ready to move it.

More specifically speaking, the object of my invention is to provide means whereby the device can be both moved and locked by one and the same system of operative parts.

An illustration of my invention as applied to a clutch-shifting device is furnished in the accompanying drawings, wherein—

Figure 1 is an end elevation. Fig. 2 is a side elevation. Fig. 3 is a side elevation showing the parts in a new position.

Like parts are indicated by the same letter in all the figures.

A is a rock-shaft suitably supported in bearings B B. C is a lever secured on said shaft, whereby it may be rotated or rocked. At one end the shaft is preferably associated with and mounted on a base-plate D. Pivoted on the shaft are the bars E E, which are attached together by the pin F and bent outwardly, so as to form together a yoke to receive the clutch-shifting ring G. This ring is provided with pins H, which are received each into a slot J at the upper end of its associated bar E. Pivoted on the pin F are two links K K, which at their other ends are pivoted on the pin L. Two other similar links M M are pivoted on the pin N in the standard O, which rises from the base D. Rigid on the shaft A is the short link P, pivoted at its other end at R to the extensible rod S. The two members of this rod are made extensible by the screw-sleeve T. The upper end of the rod S is pivoted to the pin L.

It will be readily understood that this drawing is in a sense diagrammatic and not intended to show the precise forms, shapes, and sizes of the several parts illustrated, nor is it intended to indicate that the form illustrated is the only form in which my invention can be realized. I have only sought here to show one form of my invention or to make a drawing which would illustrate to a mechanic the idea of my invention, whereupon a good mechanic could undoubtedly put it into greatly-varying forms without departing from the spirit of my invention.

The use and operation of my invention are as follows: The hand-lever C, which may be placed at any distance and in any desired position by prolonging the shaft A or by otherwise connecting the hand-lever with the other parts, is operated to rotate said shaft A. If the hand-lever has been operated to bring the parts into the position indicated in Fig. 2, the motion if continued a little further will bring the two links K and M down at their connected points, so as to produce a straight line through their longitudinal axes, and here the parts are brought to rest. The rock-bars E E under these conditions are thrown to the limit of their excursion in one direction, and they are so related to the clutch that the device moved by them causes the clutch, we will suppose, to be thrown into operation. The operator now releases the hand-lever or other similar controlling device, and the parts will thereupon be found to be locked very securely in position, because in order to free the clutch it is necessary for the rock-bars E E to move away from the position toward which they have just been moved; but in order to do this they must first displace the two links K and M, which, however, present a straight line in opposition to such movement. There is of course a certain amount of friction among the several parts, so that an enormous pressure exercised in this direction would be required before such straight line could be broken down or the links K and M made to knuckle, even though the straight line were not an absolutely straight line. Thus the clutch is locked in its operative position. When the clutch is to be freed or moved to the limit of its excursion in the other direction, the hand-lever is moved, the rock-shaft rotated, and the parts brought to the position indicated in Fig. 3. This requires no particular effort because the pressure derived from the operator's hand is applied at the weakest point to break down the previous locking arrangement of the links K and M. When this movement is completed, the parts assume the position shown in Fig. 3, and the clutch is thrown to its opposite limit. If now the clutch develops any disposition to return, it finds that effort opposed by the difficulty of breaking down the straight line formed by the short link P and the rod S, for to permit such motion of the clutch the links K and M must be moved toward their straight-line position, and this means that the pin L must be forced downwardly; but this action requires a pressure exerted in the direction of the straight line through the short link P and the rod S. Thus, again, the clutch is locked at the opposite limit of its excursion.

The screw-sleeve T is adapted to vary the length of the two-part rod S, and thus to adjust the parts so as to vary the length of the excursion of the clutch shifting or controlling device. This part T can thus be operated to take up lost motion or to adjust for the inequalities or imperfections of the several parts of the device and also to vary the length of throw or excursion of the clutch-controlling part.

As previously suggested, it is not necessary that the parts should form an absolute straight line in order to secure the substantial effect of my invention. For example, it would be sufficient if the bars K and M should assume at the end of their action the position shown in Fig. 2, and it is in this sense that I use the term "straight line" in discussing or referring to these sets of links on the rod and arm, which latter may also be considered as a set of links.

I claim—

1. In a controlling device, the combination of a movable part with pivoted bars on which it is supported, a fixed standard, short links pivoted together, and at their other ends respectively to the fixed standard and the pivoted bars, a rock-shaft, a lever to rock the same, an arm thereon, and a rod pivoted to the arm and to the short links at the point where they are pivoted together.

2. In a controlling device, the combination of a movable part with links pivoted together and at one end pivotally connected with the movable part and at the other with a fixed part, and means for moving these links at the point where they are pivoted together to move the movable part, said means comprising two links pivoted together and one of them to a fixed part.

3. In a controlling device, the combination of a movable part with links pivoted together and at one end pivotally connected with the movable part and at the other with a fixed part, and means for moving these links at the point where they are pivoted together to move the movable part, said means comprising two links pivoted together and one of them to a fixed part, and arranged so as to form a straight line when the short links do not form a straight line.

4. In a controlling device, the combination of a movable part with means for moving it, comprising two sets of pivoted links adapted to successively form each set a straight line to lock the movable part at the limit of its excursion in either direction.

5. In a controlling device the combination of a movable part with links connected thereto adapted to form a straight line to lock the movable part in one direction, and a second set of links connected with the first, and adapted to form a straight line to lock the movable part at the limit of its excursion in the other direction.

6. In a controlling device the combination of a movable part with a rock-shaft and a connection from the rock-shaft to the movable part comprising two sets of links, adapted one to form a straight line to lock the movable part at the limit of its excursion in one direction, and the other to form a straight line to lock the movable part at the limit of its excursion in the other direction.

7. In a controlling device, the combination of a movable part with two systems of links, one connected with the movable part, the other with the first-mentioned system, and the two arranged so that they successively form straight lines, one to lock the movable part at the limit of its excursion in one direction, and the other to lock it at the limit of its excursion in the opposite direction.

8. In a controlling device, the combination of a movable part with a system of links connected therewith at one end and to a fixed point at the other end, and a second system of links connected at one end to a fixed point and at the other end to the first system of links intermediate between the two ends of such first system.

9. In a controlling device, the combination of a movable part with a system of links connected therewith at one end and to a fixed point at the other end, and a second system of links connected at one end to a fixed point and at the other end to the first system of links intermediate between the two ends of such first system, and means for varying the position of the second system of links to vary the position of the first system and thus move such movable part.

10. In a controlling device, the combination of a movable part with a system of links connected therewith at one end and to a fixed point at the other end, and a second system of links connected at one end to a fixed point and at the other end to the first system of links intermediate between the two ends of such first system, and means for varying the position of the second system of links to vary the position of the first system and thus move such movable part, each of said systems of links adapted in turn to form a straight line to lock the movable part at the limit of its excursion in either direction.

11. In a controlling device, the combination of a movable part with links pivoted together and at one end pivotally connected with the movable part and at the other with a fixed part, means for moving these links at the point where they are pivoted together to move the movable part, and an adjusting device associated with the means for moving the links so as to vary the excursion of the controlling device.

12. In a controlling device, the combination of a movable part with means for moving it, comprising two sets of pivoted links adapted to successively form each set a straight line to lock the movable part at the limit of its excursion in either direction and one of said sets of pivoted links adjustable in length to vary the motion of the controlling device.

13. In a controlling device, the combination of a movable part with a system of links connected therewith at one end and to a fixed point at the other end, and a second system of links connected at one end to a fixed point and at the other end to the first system of links intermediate between the two ends of such first system, said second system of links adjustable as to length to vary the excursion of the controlling device.

14. In a clutch-moving mechanism, the combination of a device to connect with the clutch, pivoted bars on which it is supported, a rock-shaft and means for operating the same, and a connection from the rock-shaft to the bars, consisting of two sets of links.

15. In a clutch-moving mechanism, the combination of a device to connect with the clutch, pivoted bars on which it is supported, a rock-shaft and means for operating the same, and a connection from the rock-shaft to the bars, consisting of two sets of links, one set substantially at right angles to the other and connected with such other set after the manner of toggle-bars.

16. In a clutch-moving mechanism, the combination of a device to connect with the clutch, pivoted bars on which it is supported, a rock-shaft and means for operating the same, a connection from the rock-shaft to the bars, consisting of two sets of links, one set substantially at right angles to the other and connected with such other set after the manner of toggle-bars, and an adjustable device associated with said links so as to vary the throw of the clutch-controlling part.

GEORGE LEWIS HOLMES.

Witnesses:
WALTER CLEMENT HAIGH,
B. A. GAYMAN.